United States Patent [19]

McCarthy, III. et al.

[11] Patent Number: 5,134,927

[45] Date of Patent: Aug. 4, 1992

[54] AUTOMATIC FORCED AIR FOOD HEATING APPARATUS

[76] Inventors: Edward McCarthy, III., 6895 W. Riverside Way, San Jose, Calif. 95129; Rankin A. Milliken, 882 Hamilton Dr., Pleasant Hill, Calif. 94523

[21] Appl. No.: 639,923

[22] Filed: Jan. 10, 1991

[51] Int. Cl.⁵ .................................... A47J 37/04
[52] U.S. Cl. ........................ 99/427; 99/337; 99/357; 99/443 R; 99/447; 99/450; 34/133 R; 126/21 A; 219/389; 219/400
[58] Field of Search ............... 99/357, 427, 443 R, 99/450, 337, 355, 447, 479, 483; 34/133; 219/389, 400; 126/21 A

[56] References Cited

U.S. PATENT DOCUMENTS

| | | | |
|---|---|---|---|
| 1,812,016 | 6/1931 | Nieloud | 219/389 |
| 2,101,417 | 12/1937 | Waldvogel | 99/357 |
| 2,301,922 | 11/1942 | Atti | 99/355 |
| 2,562,713 | 7/1951 | Harrison | 99/443 R |
| 2,939,383 | 6/1960 | Kanaga | 99/427 |
| 3,690,247 | 9/1972 | Van Cleuen et al. | 99/355 |
| 3,807,292 | 4/1974 | Cinger | 99/348 |
| 3,870,193 | 3/1975 | Schneider | 99/427 |
| 3,875,372 | 4/1975 | Gilliom | 219/398 |
| 4,155,294 | 5/1979 | Langhammer et al. | 99/427 |
| 4,157,061 | 6/1979 | Margus | 99/352 |
| 4,203,358 | 5/1980 | Vogt | 99/427 |
| 4,295,419 | 10/1981 | Langhammer | 99/427 |
| 4,439,459 | 3/1984 | Swartley | 219/400 |
| 4,455,924 | 6/1984 | Wenzel | 99/333 |
| 4,491,065 | 1/1985 | Poulson | 99/327 |
| 4,586,429 | 5/1986 | Hawkins | 99/407 |
| 4,683,666 | 8/1987 | Igusa et al. | 34/133 |
| 4,771,163 | 9/1988 | Thiboutot | 126/21 A |

FOREIGN PATENT DOCUMENTS

| | | | |
|---|---|---|---|
| 2448402 | 4/1976 | Fed. Rep. of Germany | 99/427 |
| 2657744 | 6/1978 | Fed. Rep. of Germany | 99/427 |
| 458318 | 10/1913 | France | 34/133 |
| 693103 | 11/1930 | France | 219/389 |
| 321445 | 6/1957 | Switzerland | 99/427 |

*Primary Examiner*—Harvey C. Hornsby
*Assistant Examiner*—Mark Spisich
*Attorney, Agent, or Firm*—Rankin A. Milliken

[57] ABSTRACT

Automatic forced air food heating apparatus having an automatic feeding bin for automatically feeding french fries or the like into a rotary heating basket, a warming compartment for maintaining foods heated in the heating basket at serving temperature for extended periods of time, automatically-operated means for automatically dropping the heated food into the warming compartment, automatically-operated means for shielding the operator from direct contact with the heating basket, and automatic cooling means for cooling the apparatus in preparation for the manual cleaning thereof, etc.

7 Claims, 4 Drawing Sheets

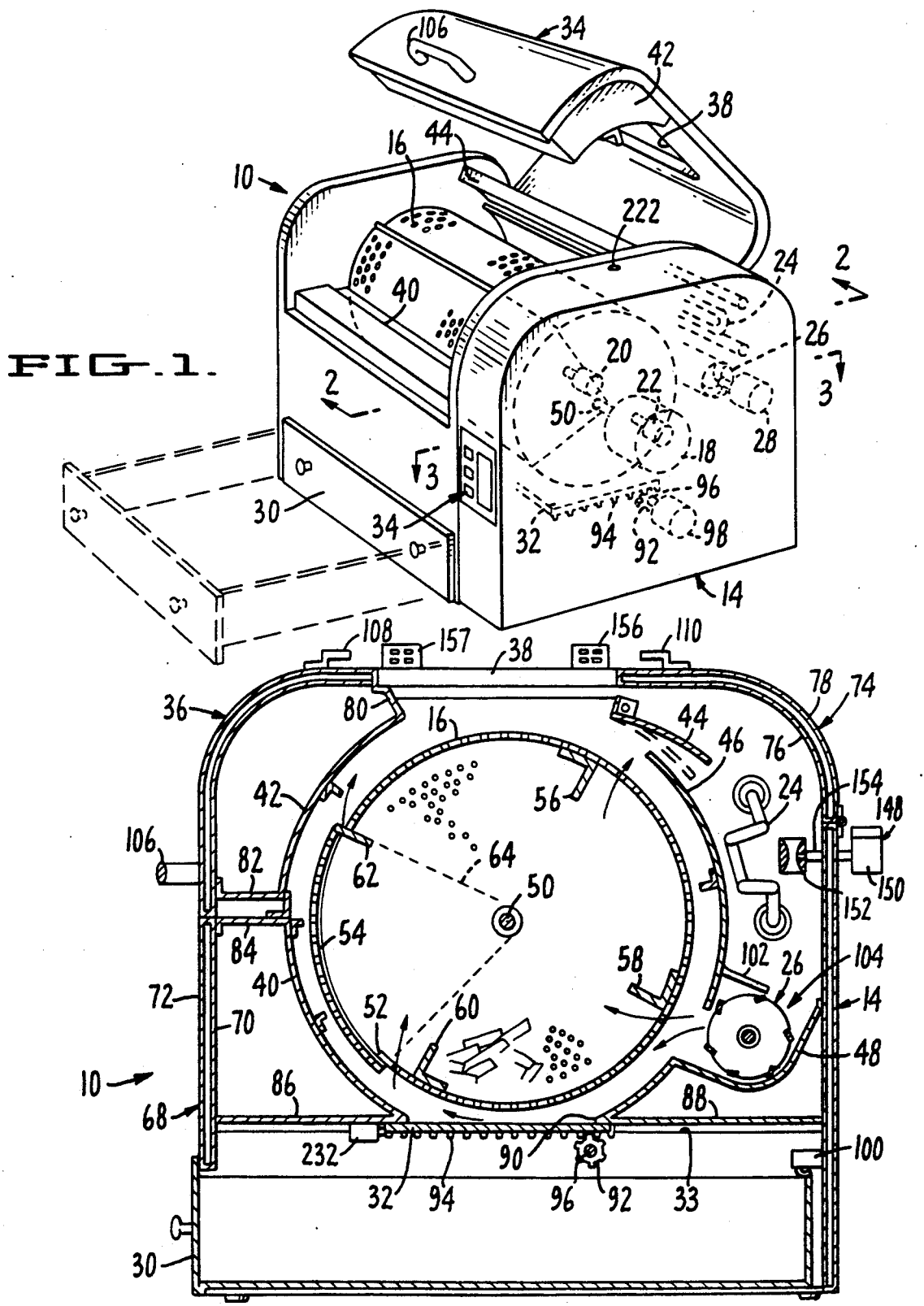

AUTOMATIC FORCED AIR FOOD HEATING APPARATUS

BACKGROUND OF THE INVENTION

1. Field of the Invention

The present invention relates to cooking apparatus, and more particularly to automatic forced air food heating apparatus for completing the cooking of partially precooked fried foods, such as french fries.

2. Description of the Prior Art

Forced air heating devices for completing the cooking of partially precooked fried foods are well known in the prior art. Such devices are shown and described, for example, in U.S. Pat. No. 4,155,294, issued to Jerome Langhammer and Richard C. Winkler on May 22, 1979; in U.S. Pat. No. 4,295,419, issued to Jerome Langhammer on Oct. 20, 1981; in U.S. Pat. No. 3,870,193, issued to J. Raymond Schneider on May 11, 1975; in U.S. Pat. No. 3,807,292, issues to Jean Deprimus Cinter on Apr. 30, 1974; U.S. Pat. No. 4,455,924, issued to Robert J. Wenzel on Jun. 26, 1984; U.S. Pat. No. 4,157,061, issued to Albert F. Margus, Jr. on Jun 5, 1979; U.S. Pat. No. 4,586,429, issued to John Hawkins on May 6, 1986; U.S. Pat. No. 3,690,247, issued to R. E. Van Cleve, et al. on Sep. 12, 1972; and U.S. Pat. No. 4,491,065, issued to Larry Poulson on Jan. 1, 1985.

No representation or admission is made that any of the above-listed patents is part of the prior art, or that a search has been made, or that no more pertinent information exists.

A copy of each of the above-listed patents was supplied to the United States Patent and Trademark Office with the present patent application.

Prior art forced air food heating devices such as those of the Langhammer, Langhammer and Winkler, and Poulson patents require that each charge of foodstuffs to be heated be manually inserted into the heating basket by the operator, and manually removed from the heating basket by the operator.

This manual mode of operation has several major disadvantages, not the least of which is the exposure of the operator to the hazard of painful burns occasioned by hand or arm contact with the hot heating basket. This hazard is especially great in establishments in which the operator has many duties in addition to the operation of such food heating devices. Such establishments, e.g., bars, taverns, motion picture theaters, and the like, constitute a major field of application for forced air food heating devices. Further, this hazard may in some cases cause insurance underwriters to deny insurance coverage to such establishments. Yet further, this hazard may cause considerable difficulty with state and federal occupational health and safety authorities. In addition to these safety, hazards, such prior art manually operated forced air forced heating devices require sufficient operator attention, especially during the food charging and discharging operations, as to be economically marginal in situations in which the attention of the operator is already substantially fully occupied with other duties, such as bartending, selling theater tickets, etc.

(The term "prior art" as used herein or in any statement made by or on behalf of applicants means only that any document or thing referred to as prior art bears, directly or inferentially, a date which is earlier than the effective filing date hereof.)

SUMMARY OF THE INVENTION

Accordingly, it is an object of the present invention to provide automatic forced air food heating apparatus in which the loading and unloading of the heating basket is substantially fully automatic.

Another object of the present invention is to provide automatic forced air food heating apparatus in which the hands and arms of the operator are not directly exposed to the hot heating basket, and means are provided for injecting cooling moisture for rapid cooling of the interior of the apparatus, including the heating basket.

Yet another object of the present invention is to provide automatic forced air food heating apparatus which requires far less operator attention than was the case with certain prior art forced air food heating apparatus.

Other objects of the present invention will in part be obvious and will in part appear hereinafter.

The present invention, accordingly, comprises the apparatus embodying features of construction, combinations of elements, and arrangements of parts all as exemplified in the following disclosure, and the scope of the present invention will be indicated in the appended claims.

In accordance with a principal feature of the present invention, automatic forced air food heating apparatus is provided which comprises an automatic feeding bin which automatically feeds charges of partially precooked food to the heating basket.

In accordance with another principal feature of the present invention, the heating basket is provided with an automatically operated door which is automatically positioned and opened to receive each charge of partially precooked food from the automatic feeding bin.

In accordance with yet another principal feature of the present invention, said heating basket door is also arranged to be automatically positioned and operated when each charge of food is fully heated, whereby to drop the fully heated food into a delivery drawer or bin which also serves to maintain the temperature of each fully cooked charge of food until the operator is ready to serve all or part thereof.

I accordance with a further principal feature of the present invention, an automatically operated partition is provided between said delivery drawer and said heating basket, whereby the operator is protected from contact with the hot air originating at the heating basket and its associated air blower and air heating element.

In accordance with an additional principal feature of the present invention, automatic means are provided for deenergizing the air blower whenever the outer doors of the automatic feeding bin are open or the delivery drawer is unclosed.

In accordance with yet another principal feature of the present invention, a major part of the wall of the cabinet of the forced air food heating apparatus of the invention is hinged for rotary displacement, to provide easy access to the inside of the cabinet for the cleaning thereof and for the removal of the rotary heating basket for cleaning.

In accordance with a further principal feature of the present invention, an aerated fluid injector is provided whereby to inject cooling water vapor, cleaning solution vapor, or french fry coating vapor into the cabinet of the apparatus of the invention.

In accordance with another principal feature of the present invention the vapor applying nozzle means of said injector is the heating basket shaft.

For a fuller understanding of the nature and objects of the present invention reference should be had to the following detailed description, taken in connection with the accompanying drawings.

BRIEF DESCRIPTION OF THE DRAWINGS

FIG. 1 is a perspective view of an automatic forced air food heating apparatus embodying the present invention, with the automatic food charge feeding bin removed and the cabinet interior access door in its open position;

FIG. 2 is a vertical sectional view of the automatic forced air food heating apparatus of FIG. 1, with the feeding bin removed and the cabinet interior access door in its closed position, taken along line 2—2 of FIG. 1;

DESCRIPTION OF THE PREFERRED EMBODIMENT

Figure 3:
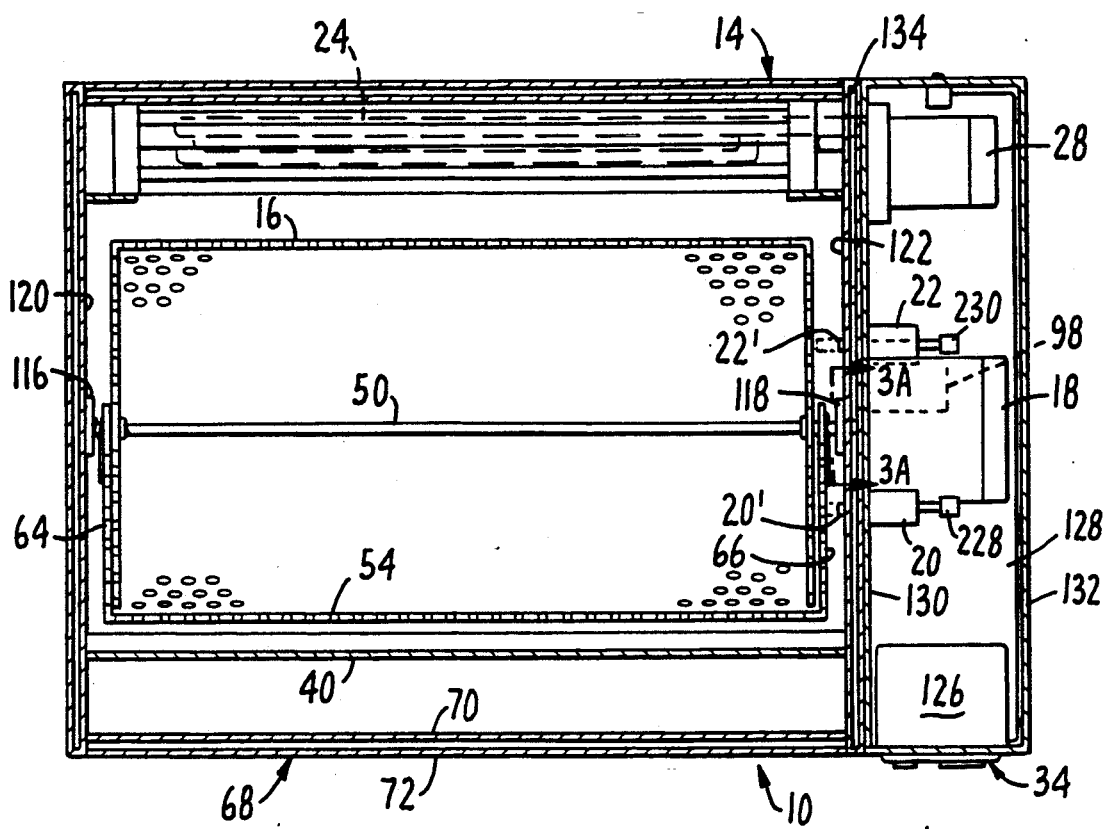
FIG. 3 is a horizontal sectional view of the automatic forced air food heating apparatus of FIG. 1, taken on line 3—3 of FIG. 1.

Referring now to FIG. 1, there is shown the principal part of an automatic forced air food heating apparatus (hereinafter "automatic oven" or "oven") 10 of the present invention. (The remaining major part of the automatic oven 10 of this embodiment of the present invention is the automatic food charge feeding bin 12 shown in FIGS. 6 and 7). Referring again to FIG. 1, there are shown the cabinet 14 of automatic oven 10, the rotary cooking or food heating basket 16, the food basket rotating motor 18, the food basket door operating solenoids 20, 22, the air heating element 24, the air blower 26, and the air blower drive motor 28. Also shown in FIG. 1 are the delivery drawer 30, and the food delivery drawer cover partition 32. Yet further shown in FIG. 1 is the manually operable control panel 34 whereby the operation of the automatic control system of automatic oven 10 can be manually initiated, its operating parameters varied selectively, etc.

As also seen in FIG. 1, cabinet 14 is provided with a hinged cover or cabinet access door 36 whereby access to the interior of cabinet 14 may be had for maintenance and cleaning. Cabinet access door 36 is provided with an opening 38 through which food to be heated is dropped into heating basket 16 by automatic feeding bin 12.

Also seen in FIG. 1 are airstream directing partitions 40, 41, and 44.

Referring now to FIG. 2, it will be seen that cabinet 14 contains two additional airstream directing partitions 46 and 48.

Figure 4:
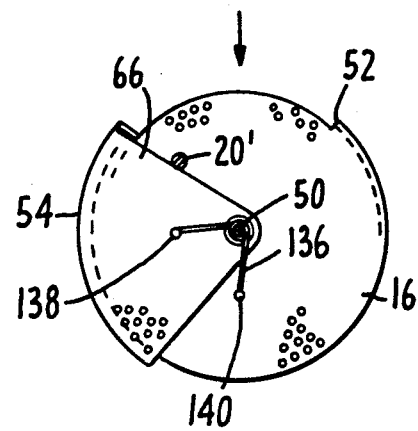
FIG. 4 is an end view of the rotary heating basket, shown in its food loading condition.
Figure 5:
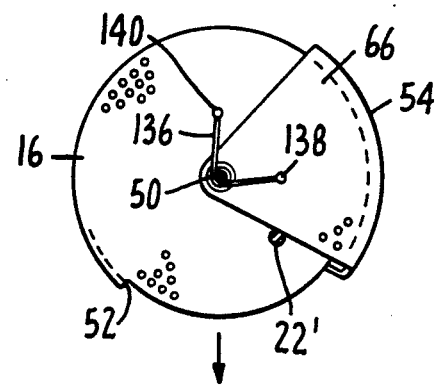
FIG. 5 is an end view of the rotary heating basket, shown its food unloading condition.

As further seen in FIG. 2, food heating basket 16 is circular in cross section, and is irrotatably mounted on a shaft 50. Food heating basket 16 is provided with a food receiving and discharging opening 52, which is normally covered by a retractable door 54 and is spring-loaded into its closed position, as seen in FIGS. 4 and 5.

As seen in FIGS. 1 and 2, food heating basket 16 is fabricated from foraminous sheet material, e.g., punched stainless steel. Alternatively, food heating basket 16 may be comprised of a rigid or semi-rigid frame which is covered with suitable screen or mesh material, e.g., stainless steel mesh.

As best seen in FIG. 2, food heating basket 16 is also provided on its inner surface with a plurality of vanes 56, 58, 60, and 62; vane 62 being a part of or affixed to spring-loaded, retractable basket door 54.

As best seen by comparing FIGS. 2 and 3, retractable basket door 54 is rotatably mounted on shaft 50 by means of wedge-shaped sectors 64, 66. Wedge-shaped sectors 64, 66 are provided with sleeve bearings by means of which they are rotatably mounted on shaft 50.

As will also be understood from FIG. 2 by those having ordinary skill in the art, informed by the present disclosure, the portion of cabinet 14 which contains food heating basket 16 is provided with double outer walls for heat conservation. For example, the frontmost planar wall 68 of cabinet 14 is comprised of an inner stainless steel wall 70 and an outer stainless steel wall 72. Similarly, the rearmost wall portion 74 of hinged access door 36 is comprised of an inner stainless steel wall 76 and an outer stainless steel wall 78.

Referring again to FIG. 2, it will be seen that airstream director 42 is maintained in its operating position by means of overturned portions 80, 82, the outer ends of which overturned portions are affixed to a wall of hinged access door 36, as by spot welding. Similarly, airstream director 40 is affixed to said frontmost wall 68 by means of overturned portions 84, 86, the ends of which remote from director 40 are affixed to wall 68, e.g., by spot welding. Yet again, the upper end of airstream director 48 is affixed directly to the rearmost wall of cabinet 14, e.g., by spot welding, and the lower end of air stream director 48 is affixed to said rearmost wall by means of overturned portion 88, the outer end of which is affixed to said rear mostwall, e.g., by spot welding.

As also seen in FIG. 2, airstream director supporting members 86, 88 also serve to define the upper wall of the compartment which contains delivery drawer 30, and to define therebetween an opening 90 through which foodstuffs heated in heating basket 16 are discharged into delivery drawer 30. This opening (90) is normally closed by sliding delivery drawer cover partition 32 (FIG. 2), (which is slidably captive on rails 33 and 33' located on the other end wall of the heating basket compartment). Delivery drawer cover partition 32 is operated between its open and closed positions by means of motor driven pinion 92, which coacts with rack 94. Suitable slider bearings (not shown) are provided to prevent the cocking and jamming of drawer cover 32 when operated. Further, a corresponding rack 94' is affixed to the opposite edge of cover 32, and rack 94' is engaged with a corresponding pinion 92' which is affixed to the opposite end of shaft 96. Pinions 92 and 92' are irrotatably affixed to shaft 96, which is itself rotated by drive motor 98 (FIG. 1).

As also seen in FIG. 1, a suitable snap-action switch 100 is affixed to the rearmost wall of cabinet 14 in such position that it is operated by delivery drawer 30 when and only when delivery drawer 30 is in its fully closed position. Snap-action switch 100 is incorporated in the automatic control system of automatic oven 10 in such manner, well within the scope of those having ordinary skill in the art, that blower motor 28 is inoperative whenever delivery drawer 30 is not in its fully closed position, except during the cooling mode of the invention.

It is also to be noted that airstream directors 44 and 46 are mounted upon the sidewalls of the heating basket compartment of cabinet 14, and thus maintained in the positions shown in FIG. 2, except that airstream director 44 is angularly adjustable in order to make it possible to selectively vary the air passage between airstream directors 44 and 46. Further, airstream director 46 is provided with an auxilliary airstream director 102, extending from side wall to side wall of the heating basket compartment of cabinet 14, which serves to define a suitable input aperture 104 for air intake to hot air blower 26.

As best seen in FIG. 1, hinged cover 36 is provided with a handle 106 whereby it may be manually moved from its closed position (FIG. 2) to its open position (FIG. 1).

Figure 6:
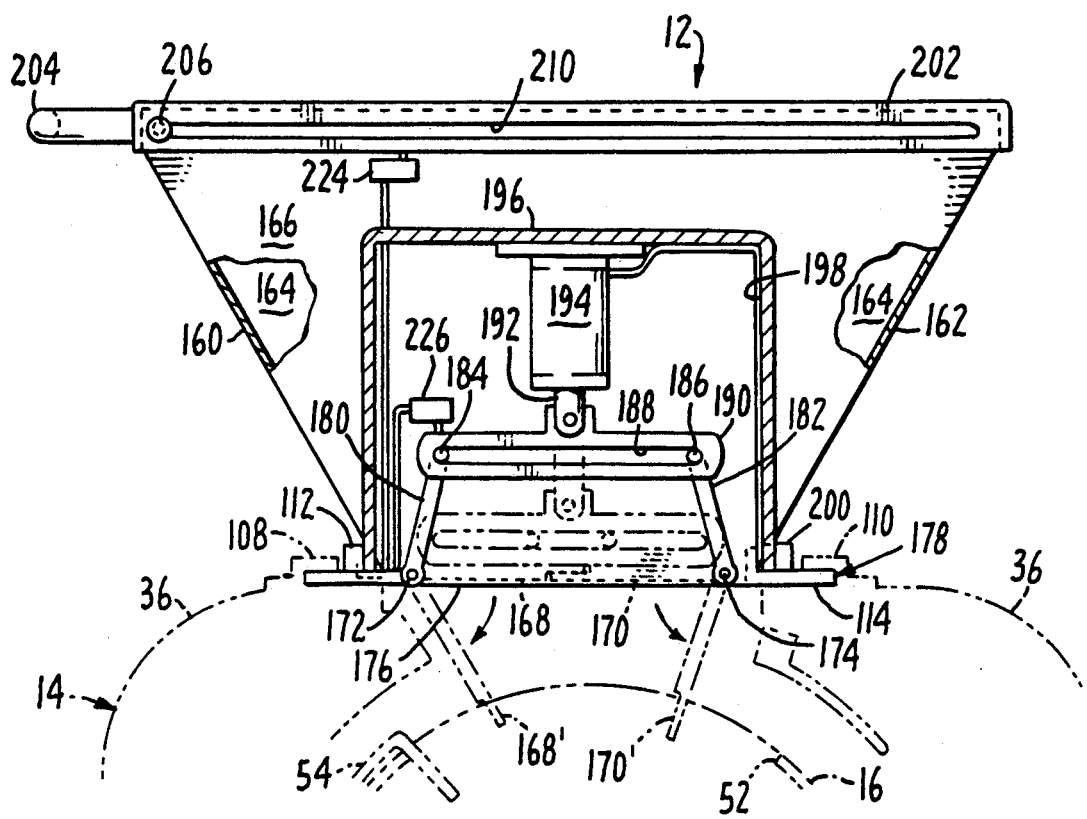
FIG. 6 is an elevational view, partly in section, of an automatic food charge feeding bin adapted to be used in connection with the apparatus of FIG. 1, including a partial sectional view (in phantom) of the forced air food heating apparatus portion shown in FIG. 1.
Figure 7:
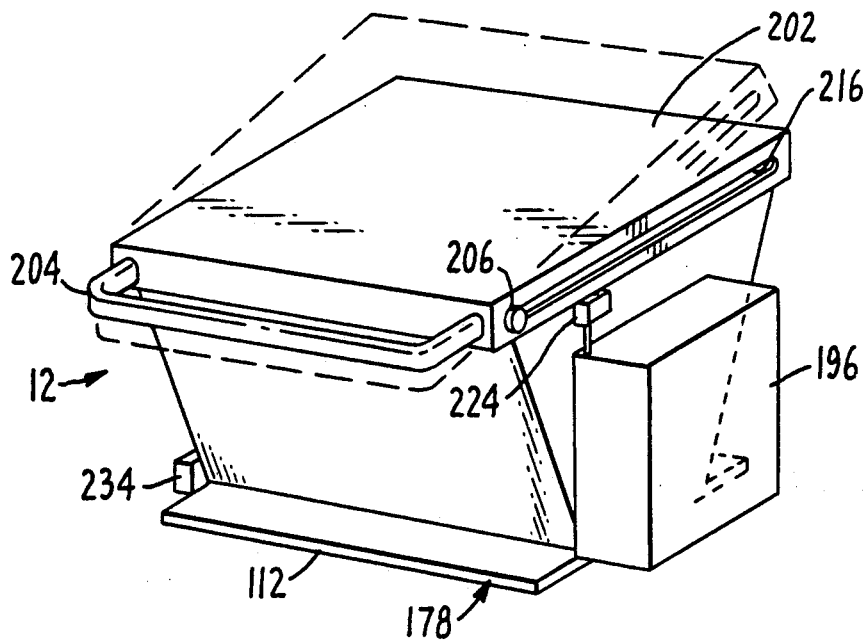
FIG. 7 is a perspective view of the automatic food charge feeding bin of FIG. 6.

As best seen in FIG. 2, a pair of rails 108, 110 are respectively affixed to the top of hinged cover 36, each rail being disposed closely adjacent an edge of food charging opening 38. Each of these rails is securely affixed to the top of hinged cover 36 and provides a projecting lip spaced from the top of hinged cover 36, each of which projecting lips is constructed and arranged to overhang and closely embrace a projecting lip of automatic food charge feeding bin 12 (FIGS. 6 and 7). Thus, as seen in FIG. 6, the overhanging lip of rail 108 closely embraces lip 112 of automatic feeding bin 12, and the overhanging lip of rail 110 closely embraces lip 114 of automatic feeding bin 12, whereby automatic feeding bin 12 is maintained in the indicated position (FIG. 6) on the top of hinged cover 36, and is so maintained whether cover 36 in its closed position or its open position or any position therebetween. Suitable detents (not shown) are provided for maintaining automatic feeding bin 12 against sliding logitudinally on rails 108, 110, except when intentionally released, as for servicing automatic oven 10.

Referring now to FIG. 3, it will be seen that shaft 50 of food heating basket 16, which is itself irrotatably affixed to heating basket 16, extends through the ends of heating basket 16. It will further be seen in FIG. 3 that the respective ends of shaft 50 are rotatably disposed in pillow blocks 116, 118, each of which is affixed to its associated sidewall of the heating basket compartment of cabinet 14; i.e., pillow block 116 is affixed to inner end wall member 120 of cabinet 14 and pillow block 118 is affixed to inner end wall 122 of cabinet 14.

Figure 3A:
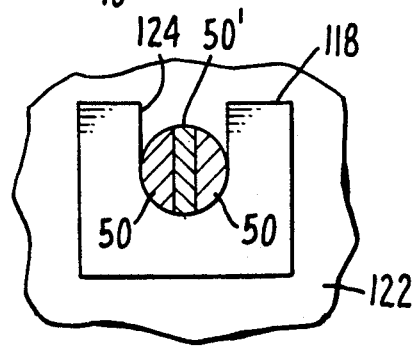
FIG. 3A is an elevational view of a small part of one wall of the cabinet of the apparatus of FIG. 1.

As best seen in FIG. 3A, pillow block 118 defines an upwardly open slot 124 the bottom of which is semicircular, whereby slot 124 is adapted to receive its associated end of shaft 50 and to rotatably journal the same in the position indicated in FIG. 3, shaft 50 being maintained therein by the force of gravity acting on heating basket 16. Pillow block 116 is substantially identical to pillow block 118. By this means, heating basket 16 is easily removable from cabinet 14, e.g., for cleaning.

It is to be particularly noted, however, that in accordance with a principal feature of the present invention the end of shaft 50 resting in pillow block 118 is slotted to recieve the shaft 50' of drive motor 18, which motor shaft is ground flat to closely fit within the slot in the end of basket shaft 50, as seen in FIG. 3A. By this means basket 16 can easily be removed from cabinet 14 for cleaning, etc., whenever the flat ground portion of drive motor shaft 50' is vertically positioned as shown in FIG. 3A.

Also shown in FIG. 3 is the housing 126 containing the electronic control system which is a principal feature of the present invention. Compartment 128, shown in FIG. 3, which contains basket position control solenoids 20, 22, blower drive motor 28, basket drive motor 18, and delivery drawer cover drive motor 98, is separate from the compartment which contains food heating basket 16, to avoid the adverse effects of heat, and thus comprises sidewalls 130 and 132, sidewall 132 being spaced by a small distance from outer sidewall 134 of the heating basket compartment As indicated in dashed lines in FIG. 3, the plungers 20', 22', of basket position control solenoids 20, 22, extend into the plane of basket door supporting sector 66 when their respective solenoid coils are energized, and thus act as stops against the rotation of basket door 54 about basket shaft 50, making it possible to open basket door 54 by means of the driving action of basket drive motor 18 when the basket door is stopped by a selected one of these solenoids.

Referring to FIGS. 4 and 5, it will be seen that food heating basket 16 is provided with a door closing spring 136 which resiliently biases basket door 54 toward its closed position, i.e, the position in which vane 64 contacts one side of opening 52 in the manner illustrated in FIG. 1 and door 54 covers opening 52. As also seen in FIGS. 4 and 5, spring 136 is secured at one end to anchor 138 which is itself affixed to basket door support sector 66, and is secured at its other end to anchor 140, which is itself affixed to the body of basket 16. Thus, string 136 resiliently biases basket door 54 into its closed position, covering opening 52.

Going now to FIG. 4, it will be seen that when solenoid 20 is energized, and thus solenoid 20' is interposed in the plane of sector 66, and when further basket drive stepping motor 18 is at the same time energized, the relative motion between basket 16 and basket door 54 causes the basket assembly to assume the position shown in FIG. 4, in which opening 52 is uncovered and located directly below opening 38 in cabinet cover 36 (FIGS. 1 and 2), and thus automatic feeding bin 12 can be actuated as described below to drop a load of foodstuffs directly into basket 16.

Similarly, as shown in FIG. 5, it will be seen that when solenoid 22 is energized, and thus solenoid plunger 22' is interposed in the plane of sector 66, and at the same time basket drive stepping motor 18 is energized, the resulting relative motion between basket 16 and basket door 54 causes the basket assembly to assume the configuration shown in FIG. 5, in which opening 52 is uncovered and located directly above opening 90 (FIG. 2). If then delivery door cover 32 has been withdrawn by means of pinion drive motor 98 and solenoid 22, etc., the contents of food heating basket 16 will be dumped directly into delivery drawer 30.

Referring again to FIG. 2, there is shown the moisture injector assembly 148 which is a principal feature of the present invention.

Moisture injector 148 comprises a reservoir 150, a nozzle 152, and a conduit or supply pipe 154 communicating between reservoir 150 and nozzle 152.

As shown in FIG. 2, nozzle 152 is a venturi nozzle of the kind commonly found in automobile carburetors. Venturi nozzle 152 is actuated by the moving airstream provided by blower 26 to draw fluid from reservoir 150 via supply pipe 154, which itself passes through the double rear wall of cabinet 14.

In the manner well known in the design and construction of automobile carburetors, reservoir 150 is provided with a suitable float chamber and metering valve whereby the fluid in reservoir 150 is metered to venturi nozzle 152 at such a rate that vaporization of the fluid takes place, and the discharge from venturi nozzle 152 into the interior of cabinet 14 takes the form of a vapor, which vapor passes through blower 26 and thence is distributed throughout the interior of cabinet 14.

In one preferred embodiment of the present invention said fluid is distilled water, and the resulting water vapor distributed throughout the interior of cabinet 14 serves to rapidly cool the interior thereof, for the safety of those who must clean the interior of cabinet 14.

In accordance with an additional particular feature of the present invention, the fluid in reservoir 153 may be a suitable cleaning solution the automatic distribution of which throughout the interior of cabinet 14 expedites the cleaning thereof.

In another preferred embodiment of the present invention, injector 148 may be used to automatically distribute suitable food coating materials, e.g., comprising vitamin C, or the like, throughout cabinet 14, and thus over the food in cooking basket 16.

In some preferred embodiments of the present invention controller 126 will be so constructed and arranged that when cooling water is being injected into cabinet 14 via injector assembly 148 cover 36 may be opened (as seen in FIG. 1), drawer 30 may be removed, and partition 32 may be operated into its open position, in which it does not block opening 90.

(In other embodyments the same cooling mode may be carried out without injecting cooling water.)

When, however, injector 148 is being used to inject cleaning solution, or food coating solution, it will be preferred to maintain cove 36 and partition 32 in their closed positions.

Injector 148 may be but one of several substantially identical injectors the supply pipes of which pass through the back wall of cabinet 14 at substantially the same vertical level.

Also seen in FIG. 2 is fixedly positioned power plug 156, which is adapted to supply electrical power to automatic feeding bin 12 as taught in greater detail in connection with FIG. 6.

Referring now to FIG. 6, there is shown the automatic food charge feeding bin 12 which is a principal feature of the present invention.

As best seen in FIG. 6, automatic feeding bin 12 comprises slanted front and rear walls 160, 162, and left and right end walls 164, 166. These walls together define an open topped bin capable of receiving and holding charges of comminuted food which is to be automatically dispensed to cooking basket 16.

In addition to walls 160, 162, 164, 166, bin 12 further comprises a pair of dispensing doors 168, 170 (FIG. 6).

Doors 168, 170 are pivoted, respectively, on pivot rods 172, 174, and thus are capable of being pivotably moved between their horizontal or closed position (indicated by unprimed reference numerals) and their open position (indicated by singly primed reference numerals). Pivot rods 172, 174 are pivotably affixed at their respective ends, e.g., by being disposed in suitable close-fitting sockets, to the opposite edges of the opening 176 in the base plate 178 of bin 12 through which food is dropped into cabinet 14, and thus into heating basket 16, when doors 168, 170 are opened.

As further seen in FIG. 6, a pair of links 180, 182 are provided for operating delivery doors 168, 170 between their open and closed positions. For this purpose, both door 168 and link 180 are irrotatably affixed to pivot rod 172, and both door 170 and link 182 are irrotatably affixed to pivot rod 174. The relative positions of door 168 and link 180 are shown in FIG. 6, link 180 being shown in solid lines and door 168 being in its horizontal position. Similarly, the relative positions of door 170 and link 182 ar shown in FIG. 6, link 182 being shown in solid lines and door 170 being in it horizontal position.

The upper ends of links 180, 182 are provided respectively, with projecting pins 184, 186, which project toward the viewer in FIG. 6.

These pins are both captive in slot 188, which extends from end to end of yoke 190. Yoke 190 is itself affixed to the lower end of the plunger 192 of a solenoid 194. Solenoid 194 is affixed to the top of a housing 196 which is itself affixed to one end of bin 12, as seen in FIG. 7. By this means solenoid 194 is maintained in a fixed position with respect to pivot rods 172, 174, etc.

Solenoid 194 is a locking or latching solenoid of well known type which comprises a main coil adapted to draw plunger 192 into its upward position (shown in solid lines in FIG. 6), a spring-loaded mechanical latch adapted to latch plunger 192 in its upward position, and an unlatching or releasing coil adapted when momentarily energized to release plunger 192 to drop to its lower position (shown in dashed lines in FIG. 6).

Solenoid 194 is provided with energizing current for selectively energizing the main coil or the releasing coil, or neither, by means of a four conductor insulated wire or cable 198.

Wire or cable 198 extends from solenoid 194 to a plug 200 which is affixed to the right hand end of bin 12 in such a position that it automatically closes the energizing circuits of the main coil and the releasing coil through fixedly positioned receptacle 156 (FIG. 2) when bin 12 is locked in position on cabinet cover 36 by the full engagement of its lips 112, 114 with rails 108, 110 in the manner described hereinabove.

As will no be evident to those having ordinary skill in the art, informed by the present disclosure, the closing of doors 168, 170 (FIG. 6) may be effected by briefly energizing the main coil of solenoid 194, and doors 168, 170 will then be locked in their closed (unprimed numeral) position by the latching action of the spring-loaded latching means of latching solenoid 194 upon plunger 192.

As will also be evident to those having ordinary skill in the art, informed by the present disclosure, doors 168, 170 may, when closed, be released to drop under the action of gravity to their open position (primed numerals) by momentary energization of the releasing coil of solenoid 194.

Thus, it will be seen that by means of latching solenoid 194 dispensing doors 168, 170 may be either locked in their closed position to retain a charge of french fried potatoes or the like in bin 12 or unlatched and thus allowed to drop to their open position, thus dispensing a charge of french fried potatoes or the like to the interior of heating basket 16; assuming, of course, that heating basket door 54 is in its open position and opening 52 is in its uppermost or charge receiving position, all as shown in FIG. 6.

As may be seen by comparison of FIGS. 6 and 7, bin 12 is provided with a cover 202 having a handle 204. Cover 202 is maintained captive on the top of bin 12 by means of a pair of studs 206, 208 (not shown) each of which is contained in a slot 210, 212 (not shown) extending substantially from end to end of a side flange of cover 202. By this means the top of bin 12 can be opened by hand by slightly tilting cover 202 (as shown in dashed lines in FIG. 7) and then drawing cover 202 forward until it depends downwardly from studs 206, 208, with its lower end contacting the front of cabinet 14.

Figure 8:
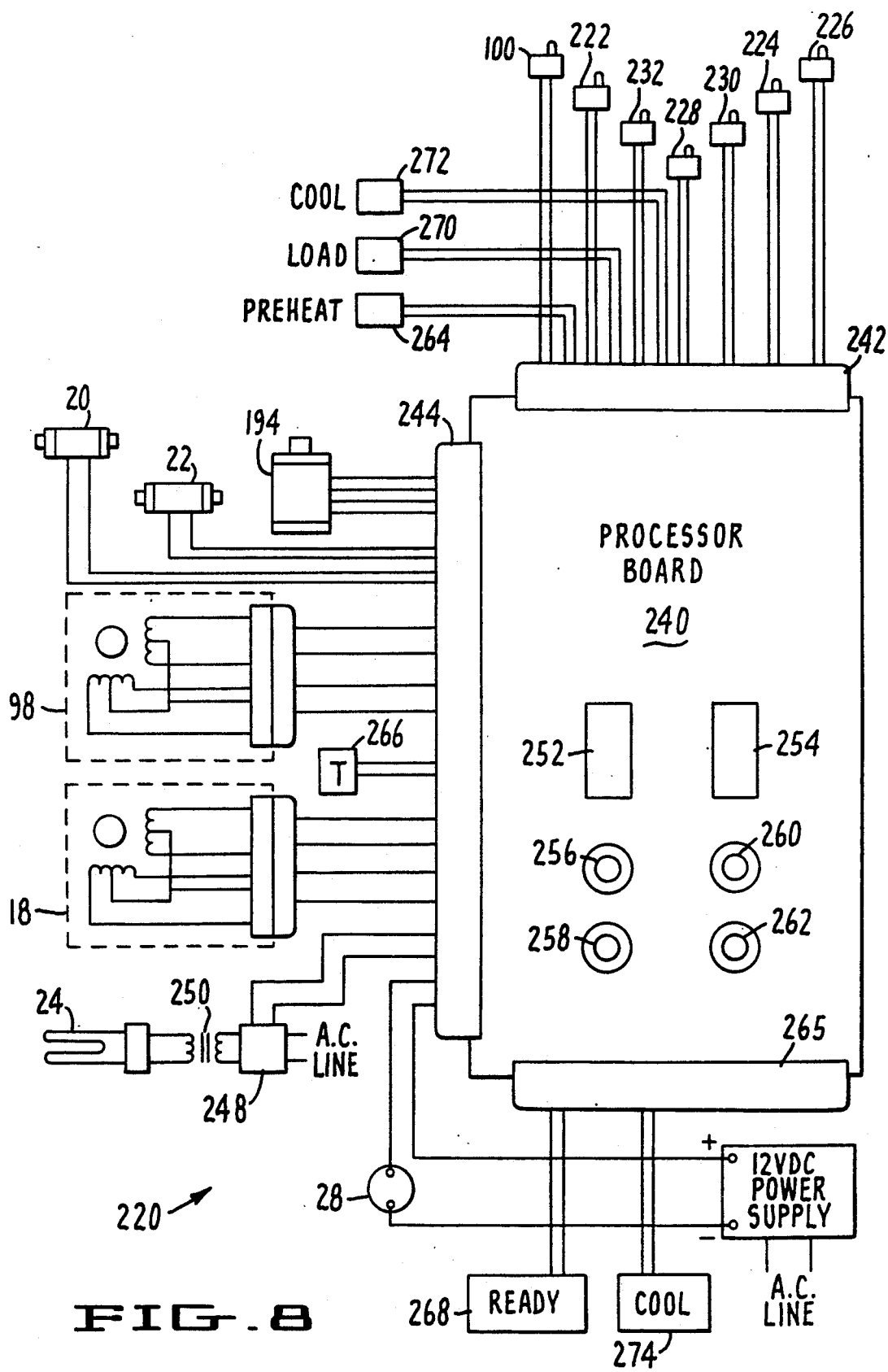
FIG. 8 is a schematic block diagram of the control system of the automatic oven of FIGS. 1 through 7.

Referring to FIG. 8, the electronic control system 220 of automatic oven 10 will now be described.

As pointed out hereinabove, the major portion of automatic control system 220 is located in housing 126 (FIG. 3). Other parts of control system 220 are located, however, in other parts of oven 10 than the interior of housing 126. Among these control system elements located remotely from housing 126 are delivery drawer home position sensing switch 100 (FIG. 2), described hereinabove; cabinet cover position sensing switch 222 (FIGS. 1 and 3), which is so located as to be actuated only when cabinet cover 36 is closed, and thus a part of housing 196 depresses the actuator of switch 222; bin cover position sensing switch 224 (FIG. 6); dispensing door position sensing switch 226.(FIG. 6); basket door operating solenoid condition sensing switches 228, 230 (FIG. 3); and delivery door position sensing switch 232 (FIG. 2). Each of these sensing switches is a suitable microswitch which is connected to the part of the electronic control system found in housing 126 to provide an indication thereto of the position or condition of the structural element of oven 10 with which it is associated. For clarity of disclosure the conductors by which these several microswitches are connected to the portion of the control system in housing 126 are not all shown herein. All such connections may, however, be provided by one having ordinary skill in the art without the exercise of independant invention or undue experimentation. In particular, it is to be noted that sensing switches 224 and 226 are connected to the control system portion in housing 126 via a fixed plug 234 (FIG. 7) which cooperates with a fixed receptacle 157 (FIG. 2), which plug and receptacle mechanically coact in the same manner as plug 200 (FIG. 6) and receptacle 156 (FIG. 2). As will be evident to those having ordinary skill in the art, informed by the present disclosure, it is by means of these sensing switches that the portion of control system 220 in housing 126 is able to prevent the types of inappropriate operation of the structural parts of automatic oven 10 which otherwise could expose the operator of oven 10 to hot air burns, contact with the hot interior parts of oven 10, etc. (A bimetal strip operated latch will in some embodiments serve to prevent the opening of cover 36 when basket 16, etc. is hot.)

Referring, then, to FIG. 8, it will be seen that each of these position or condition sensing switches is connected with the control circuitry carried by the processor board 240 via a suitable board edge connector 242, 244, or 262, of well known type.

Processor board 240 and its associated board edge connectors 242, 244, etc., are all contained in housing 126.

As schematically shown in FIG. 8, processor board 240, by means of the microprocessor 252 mounted thereon, its associated read-only memory microcircuit 254, and the associated silicon controlled rectifiers 256, 258, 260, 262, stepping motor drive circuits, etc., utilizing the structural element position and condition information provided by sensing switches 100, 222, 224, 226, 228, 230, and 232, serves to provide operating power in proper time duration and sequence to blower motor 28, heating basket drive motor 18, delivery drawer cover drive motor 98, and solenoids 20, 22, and 194, and to control the supply of alternating current line power to airstream heater 24.

As will be evident to those having ordinary skills in the art, the selection of a suitable microprocessor 252, the loading of a suitable program into associated read-only memory 250 to carry out the preferred operating modes described hereinbelow, the selection of suitable motors and solenoids and their auxilliary circuits and associated sensing switches, etc., as shown in FIG. 8 and described in connection therewith, are all within the scope of one having ordinary skill in the microprocessor-controlled device art, without undue experimentation or exercise of independant invention, and thus these components and circuits will not be described in detail herein.

OPERATION OF THE OVEN OF THE FIRST PREFERRED EMBODIMENT

Having described automatic oven 10 of the first preferred embodiment in detail, including the microprocessor-based control system 220 thereof, the operation of automatic oven 10, including the functions carried out by its control system 220, will now be described in detail. (It will be assumed in this description of operation of oven 10 that initially feeding bin 12 is locked onto cabinet cover 36 in the manner described hereinabove in connection with FIG. 6, so that plugs 200, 234 are fully engaged with their associated receptacles 156, 157, thus completing the control system circuit shown in FIG. 8; that heating basket 16 is in its operating position as shown in FIGS. 1 and 2; and that cabinet cover 36 and delivery door 13 are closed, as shown in FIG. 2.)

1. At the beginning of an operating period, e.g., day of restaurant operation, with cabinet cover 36 and delivery drawer 13 closed, the operator of oven 10 will press preheat switch 264 (FIG. 8), which is located on panel 34 (FIG. 1).

Control system 220 will then function to move delivery drawer cover 32 to its closed position, if necessary, and to pass heating current through air heater 24, and operate blower 26 until oven 10 is thus brought to its fully warmed-up condition, as determined by temperature sensing element 266, located adjacent to basket 16 and shown in FIG. 8, sensing that its pre-set upper temperature limit has been reached.

After this initial warm-up operation, and until switch 264 is again depressed, control system 220 will respond to the dropping of the temperature of oven 10, as determined by temperature sensing element 266, below a predetermined lower limit by carrying out another warm-up operation until the temperature of oven 10 again exceeds said preset upper temperature limit of temperature sensing element 266. Control system 220 also serves to energize a "ready" display lamp 268 on panel 34 (FIG. 1) whenever the temperature of oven 10 lies within the temperature zone defined by said upper temperature limit and said lower temperature limit of temperature sensing element 266 (said upper and lower temperature limits are set by suitable circuitry located on processor board 240, the provision of which circuitry is within the scope of those having ordinary skill in the art, informed by the present disclosure, without the exercise of independent invention or undue experimentation.)

2. When "ready" display lamp 268 is first lit, the operator depresses a "load" switch 270 located on panel 34. Control system 220 then advances solenoid 20', and assures that solenoid plunger 22' is retracted, and rotates heating basket 16 into the position shown in FIG. 4, wherein basket 16 is opened upwardly to receive french fries or the like from charging bin 12. The operator then puts a predetermined quantity of french fries in bin 12, after displacing bin cover 202, and then closes bin cover 202. The consequent depression of the actuator of sensing switch 224 (FIG. 6) causes control system 220 to actuate solenoid 194 and thus to permit dispensing doors 168, 170 to open and drop said quantity of french fries into basket 16.

After a predetermined time interval, control system 220 actuates solenoid 194 to close dispensing doors 168, 170, retracts solenoid plunger 20', and energizes heater 24, blower motor 28, and basket rotating motor 18, and continues to energize these devices for a predetermined cooking time interval. At the end of this time interval control system 220 deenergizes heater 24, blower motor 28, and basket drive motor 18.

3. At the end of the cooking period control system 220 will automatically operate to drive delivery drawer cover 32 to its rearmost position, thus uncovering opening 90, and will then advance solenoid plunger 22' and operate basket drive motor 18 to put heating basket 16 in its unloading condition, as shown in FIG. 5, whereupon said quantity of french fries, now fully cooked, will drop into delivery drawer 30, after which control system 220 will retract solenoid plunger 22' and return delivery drawer cover 32 to its closed position.

In this resulting condition of oven 10 the automatic warm-up cycle described above will commence whenever invoked by temperature sensing element 266 in response to the temperature sensed by sensing element 266 dropping below said lower limit.

The heat continuously radiated by delivery drawer cover 32 into delivery drawer 30 will then serve to maintain the french fries therein in hot, deliverable condition, and thus they may be manually extracted in whole or in part for sale to customers by opening delivery drawer 30. It is to be understood as a principal feature of the present invention that the continuous partition formed by wall 86, 88, and delivery door cover 32 are so constructed and arranged, and formed from such materials, that while the french fries in delivery drawer 30 are kept warm for serving for a considerable period of time, delivery drawer 30 does not become sufficiently heated to subject the operator to the hazard of burns when reaching into open drawer 30 to withdraw french fries for sale.

4. Control system 220 also functions to bring about the rapid cooling of the interior of oven 10 in preparation for inspection, repair, or cleaning, as follows.

After opening cabinet cover 36 (FIG. 1), removing delivery drawer 30, and pouring a predetermined amount of distilled water into reservoir 150, the operator presses the switch 274 marked "COOL" on panel 34 (FIG. 1).

Control system 220 then operates to open delivery drawer cover 32 and energize blower motor 28 (but not air heater 24, nor basket drive motor 18). As a result, air is circulated into the interior of cabinet 14, largely entering opening 38 and leaving by way of opening 90 and the front cabinet opening from which delivery drawer 30 has been removed. The action of Venturi 152 serves to add a small amount of water vapor to this moving airstream, which water vapor tends to more rapidly cool the interior parts of oven 10 than would otherwise be the case. In accordance with the teachings of the present invention, a cleaning material may be added to the water in reservoir 150, and thus be distributed throughout the interior of cabinet 14 for use in subsequent cleaning operations.

It will thus be seen that the objects set forth above, among those made apparent from the preceeding description, are efficiently attained, and since certain changes may be made in the above constructions and the method carried out thereby without departing from the scope of the present invention, it is intended that all matter contained in the above description or shown in the accompanying drawings shall be interpreted as illustrative only, and not in a limiting sense.

It is also to be understood that the following claims are intended to cover all of the generic and specific features of the invention hereindescribed, and all statements of the scope of that invention which, as a matter of language, might be said to fall therebetween.

What is claimed is:

1. Automatic forced air food heating apparatus, comprising:

a housing:

a foraminous food receptacle defining an interior space, said receptacle being rotatably mounted in said housing and provided with a displaceable door adapted to cover an opening through which food can pass into and out of said receptacle and means for moving said displaceable door between open and closed positions;

hot air source means for supplying hot air to said interior space of said receptacle through its foraminae;

a feeding bin having an outer door communicating with the space outside said housing and facilitating the loading of uncooked food into said feeding bin and an inner door adjacent to said receptacle and adapted to be brought into alignment with said displaceable door of said receptacle so as to feed charges of food to said interior space of said receptacle;

sensing means on said bin which determines whether said outer door is open or closed, automatic control means operatively connected to said servicing means for automatically feeding charges of food from said bin to said interior space of said receptacle through said opening only when said outer door is closed, said feeding being brought about by the opening of the inner door of the bin and the displaceable door of the receptacle; and a food receiving compartment for receiving heated food discharged from said receptacle through said opening when said displaceable door is against moved to the open position.

2. Automatic forced air food heating apparatus as claimed in claim 1, further comprising automatically-operated partition means for preventing the passage of heating air from the vicinity of said receptacle to the interior of said compartment except when food is being discharged from said receptacle into said compartment.

3. Automatic forced air food heating apparatus as claimed in claim 2, further comprising vapor injecting means for injecting vapors of food treating materials into the interior space defined by said housing during the heating of said food.

4. Automatic forced air food heating apparatus as claimed in claim 1, further comprising automatic control means including door latching means and temperature sensing means for preventing the opening of said outer door when the temperature within the interior space defined by said housing exceeds a predetermined value.

5. Automatic forced air food heating apparatus as claimed in claim 4, further comprising automatically-operated partition means for preventing the passage of heating air from the vicinity of said receptacle to the interior of said compartment except when food is being discharged from said receptacle into said compartment.

6. Automatic forced air food heating apparatus as claimed in claim 1, further comprising vapor injecting means for injecting cooling water vapor into the interior space defined by said housing during a cooling operation which takes place after the discharge of food from said receptacle.

7. Automatic forced air food heating apparatus as claimed in claim 1, further comprising vapor injecting means for injecting vapors of food treating materials into the interior space defined by said housing during the heating of said food.

* * * * *